US008984978B2

(12) United States Patent
Yang et al.

(10) Patent No.: US 8,984,978 B2
(45) Date of Patent: Mar. 24, 2015

(54) ELASTIC SUPPORT MODULE AND RACK BAR SUPPORTING DEVICE FOR VEHICLE STEERING APPARATUS HAVING THE SAME

(75) Inventors: Kwang Ho Yang, Seoul (KR); Kyoung Min Kim, Gyeongju-si (KR)

(73) Assignee: Mando Corporation, Gyeonggi-Do (KR)

( * ) Notice: Subject to any disclaimer, the term of this patent is extended or adjusted under 35 U.S.C. 154(b) by 500 days.

(21) Appl. No.: 13/495,425

(22) Filed: Jun. 13, 2012

(65) Prior Publication Data

US 2012/0318952 A1    Dec. 20, 2012

(30) Foreign Application Priority Data

Jun. 20, 2011    (KR) .................. 10-2011-0059530

(51) Int. Cl.
*F16M 13/00* (2006.01)
*B62D 3/12* (2006.01)
*F16H 55/28* (2006.01)

(52) U.S. Cl.
CPC .............. *B62D 3/123* (2013.01); *F16H 55/283* (2013.01)
USPC ............................................. 74/422; 74/409

(58) Field of Classification Search
CPC ................................ F16H 55/283; B62D 3/123

USPC ....................................................... 74/409, 422
See application file for complete search history.

(56) References Cited

U.S. PATENT DOCUMENTS

| 3,375,000 A | 3/1968 | Seamands et al. |
| 2004/0244518 A1* | 12/2004 | Odenthal et al. .............. 74/422 |
| 2009/0317025 A1* | 12/2009 | Witting et al. ................. 384/37 |
| 2011/0192250 A1* | 8/2011 | Chung .......................... 74/496 |
| 2014/0338486 A1* | 11/2014 | Taenaka et al. ............... 74/422 |

FOREIGN PATENT DOCUMENTS

CN    101734276 A    6/2010

* cited by examiner

*Primary Examiner* — William Kelleher
*Assistant Examiner* — Terence Boes
(74) *Attorney, Agent, or Firm* — McDermott Will & Emery LLP

(57) ABSTRACT

The present invention relates to an elastic support module and a rack bar supporting device for a vehicle steering apparatus, which includes the elastic support module. By the present invention, it is possible to prevent a noise from being produced due to the increase of a clearance caused when a vehicle loses the driving durability thereof to a certain degree and hence a support yoke of the vehicle is worn, or due to an impact reversely input from a road surface, and hence to provide a pleasant steering feeling for a driver when steering the vehicle.

8 Claims, 7 Drawing Sheets

ELASTIC SUPPORT MODULE AND RACK BAR SUPPORTING DEVICE FOR VEHICLE STEERING APPARATUS HAVING THE SAME

CROSS-REFERENCE TO RELATED APPLICATION

This application claims priority from and the benefit under 35 U.S.C. §119(a) of Korean Patent Application No. 10-2011-0059530, filed on Jun. 20, 2011, which is hereby incorporated by reference for all purposes as if fully set forth herein.

BACKGROUND OF THE INVENTION

1. Field of the Invention

The present invention relates to an elastic support module and a rack bar supporting device for supporting a rack bar for a vehicle steering apparatus, which includes the elastic support module. More particularly, the present invention relates to an elastic support module which can prevent a noise from being produced in a rack bar supporting device for a rack-and-pinion type steering apparatus for a vehicle due to the increase of a clearance caused when the vehicle has lost the driving durability thereof to a certain degree and hence a support yoke of the vehicle is worn, or due to an impact reversely input from a road surface, and hence can provide a pleasant steering feeling for a driver when steering the vehicle. The present invention also relates to a rack bar supporting device for a vehicle steering apparatus, which includes such an elastic support module.

2. Description of the Prior Art

As generally known in the art, a steering apparatus of a vehicle means an apparatus that allows a driver to change a driving direction of the vehicle by his/her will. The steering apparatus helps the driver to optionally change the center of rotation, about which the vehicle's front wheels are turned, so as to make the vehicle move in a direction desired by the driver.

FIG. 1 schematically illustrates a conventional rack-and-pinion type steering apparatus, and FIG. 2 is a cross-sectional view of a conventional rack bar supporting device.

As illustrated in the drawings, a conventional rack-and-pinion type steering apparatus includes: a steering wheel 100 arranged at a driver's seat side; a steering shaft 105 connected to the steering wheel 100; a steering column 103 configured to allow the steering shaft 100 to be fixed to a vehicle body; a gear box 130 provided with a rack gear 110 and a pinion gear 120 to convert a turning force input from the steering shaft 105 to a rectilinear movement; a rack bar 140 provided with an inner ball joint 135 at each end thereof; and a tie rod 150 integrally formed with a ball of the inner ball joint 135.

The tie rod 150 is connected with an outer ball joint 155 and transfers a force to a knuckle 159 to steer a tire 158.

In addition, the conventional rack bar supporting device includes a pinion gear 120, a rack bar 140, a support yoke 260, a spring 263, and a yoke plug 265. As described above, the rack-and-pinion type gear box 130 is adapted to convert a turning force input from a steering shaft (not shown) to a rectilinear movement.

The rack bar 140 is engaged with the pinion gear 120 to convert a turning movement into a rectilinear movement, in which a device for supporting the rack bar 140 in relation to the pinion gear 120 side is provided behind the rack bar 140 so as to facilitate the engagement between the rack bar 140 and the pinion gear 120.

The device for supporting the rack bar 140 includes a support yoke 260, a spring 263, and a yoke plug 265, in which the support yoke 260 is positioned opposite to the rear side of the rack bar 140, on which the rack gear 110 is formed, and is inserted into a cylinder 250 of the gear box 130 to be movable forward and backward perpendicularly to the rack bar 140.

The support yoke 260 is formed in a cylindrical shape so that it can be slid forward and backward, and on the front side thereof where the support yoke 260 is in contact with the rack bar 140, the support yoke 260 is formed with a groove of a semicircular cross-section, so that the front side of the support yoke 260 can be in close contact with the rear side of the rack bar 140.

In addition, in order to assure that the rack bar 140 and the pinion gear 120 can be in close contact with each other and a force can be efficiently transferred therebetween, the spring 263 is arranged behind the support yoke 260 to push the support yoke 260 with a predetermined pressure and a clearance produced between the rack bar 140 and the pinion gear 120 can be compensated.

The support yoke 260 is caused to be frictionally slid against the rear side of the rack bar 140. In order to prevent the rack bar 140 from being worn or producing a noise due to friction, the support yoke 260 is typically formed of a plastic material softer than the rack bar 140.

The spring 263 received in the spring groove 220 serves to apply pressure so that the support yoke 260 comes into close contact with the rack bar 140. Typically, a coil spring is employed as the spring 263, and the yoke plug 265 is positioned behind the spring 263 to support the spring 263.

The yoke plug 265 supports the spring 263, so that the spring 263 can apply pressure to the support yoke 260. Since the yoke plug 265 is typically formed with peaks and valleys of threads so that the yoke plug 265 can be fixedly engaged with the gear box 130 and a lock nut 240, which are formed with peaks and valleys of threads corresponding to those of the yoke plug 265.

However, such a conventional rack bar supporting device has problems in that when the support yoke has lost durability to a certain degree, a clearance between the support yoke and the rack bar is increased to such an extent that the support yoke cannot properly support the rack bar, and due to the increase of the clearance, a rattle noise may be produced from the support yoke and the yoke plug.

SUMMARY OF THE INVENTION

Accordingly, the present invention has been made to solve the above-mentioned problems occurring in the prior art, and an object of the present invention is to prevent a noise from being produced due to the increase of a clearance caused when a vehicle loses the driving durability thereof to a certain degree and hence a support yoke of the vehicle is worn, or due to an impact reversely input from a road surface, and to provide a pleasant steering feeling for a driver when steering the vehicle.

In order to accomplish this object, in accordance with a first aspect of the present invention, there is provided an elastic support module including: a hollow housing which is provided with collars at both sides thereof; first and second spacers which are coupled to and supported by the collars, respectively; at least two elastic members which are interposed between the first and second spacers, and each of which is formed in an annular shape to have inner and outer circumferences, each surface extending between the inner and outer circumferences being inclined in relation to the central axis of the elastic members; at least one ball support member, which is interposed between the elastic members, and is formed in an annular shape, a plurality of balls being coupled to the ball support member at positions spaced around the ball support member, respectively; and at least one annular plate support member interposed between the elastic members.

In accordance with a second aspect of the present invention, there is provided a rack bar supporting device for a vehicle steering apparatus including: a support yoke configured to support a rack bar against a pinion, and to be coupled to a cylinder of a gear box; an elastic support module configured to support the support yoke and to be coupled to the cylinder of the gear box; and a yoke plug configured to support the elastic support module and to be screw-coupled to the cylinder of the gear box, wherein the elastic support module includes: a hollow housing which is provided with collars at both sides thereof; first and second spacers which are coupled to and supported by the collars, respectively; at least two elastic members which are interposed between the first and second spacers, and each of which is formed in an annular shape to have inner and outer circumferences, each surface extending between the inner and outer circumferences being inclined in relation to the central axis of the elastic members; at least one ball support member, which is interposed between the elastic members, and is formed in an annular shape, a plurality of balls being coupled to the ball support member at positions spaced around the ball support member, respectively; and at least one annular plate support member interposed between the elastic members.

With the present invention, it is possible to prevent a noise from being produced due to the increase of a clearance caused when a vehicle loses the driving durability thereof to a certain degree and hence a support yoke of the vehicle is worn, or due to an impact reversely input from a road surface, and to provide a pleasant steering feeling for a driver when steering the vehicle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
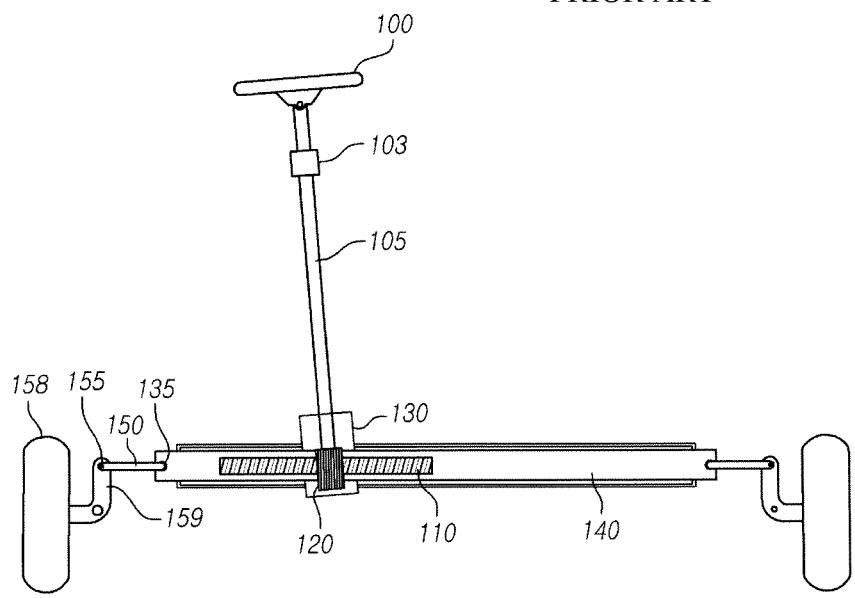
FIG. 1 is a schematic view of a conventional rack-and-pinion type steering apparatus for a vehicle.
Figure 2:
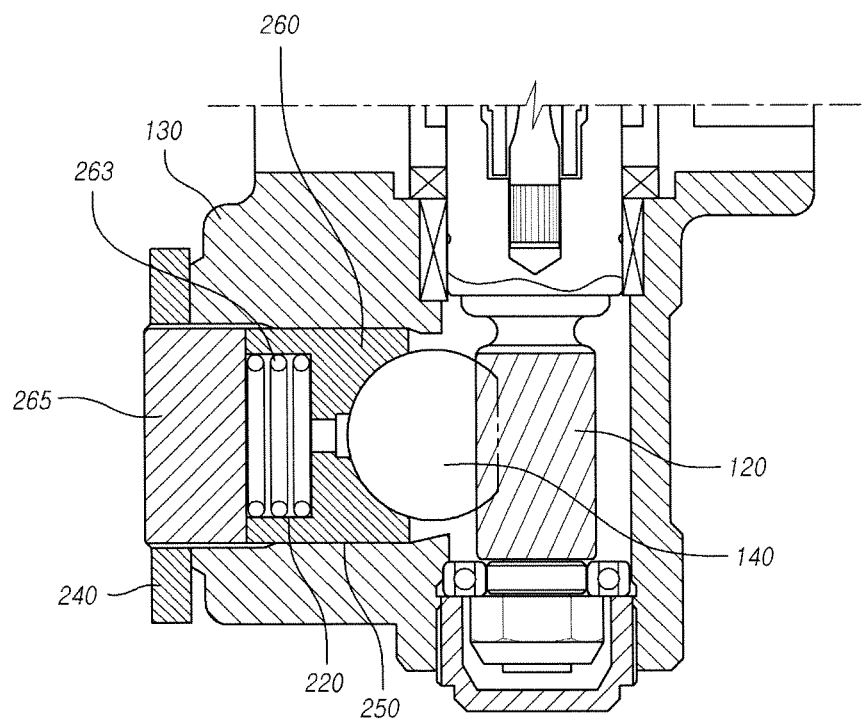
FIG. 2 is a cross-sectional view of a conventional rack bar supporting device.

Hereinafter, exemplary embodiments of the present invention will be described with reference to the accompanying drawings. In the following description, it should be noted that the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terms is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

In the detailed description of the present invention, descriptions will be made assuming that the rack bar side which is positioned in front of the support yoke is the front, and the opposite side is the rear unless specifically defined, for the convenience of description.

Figure 3:
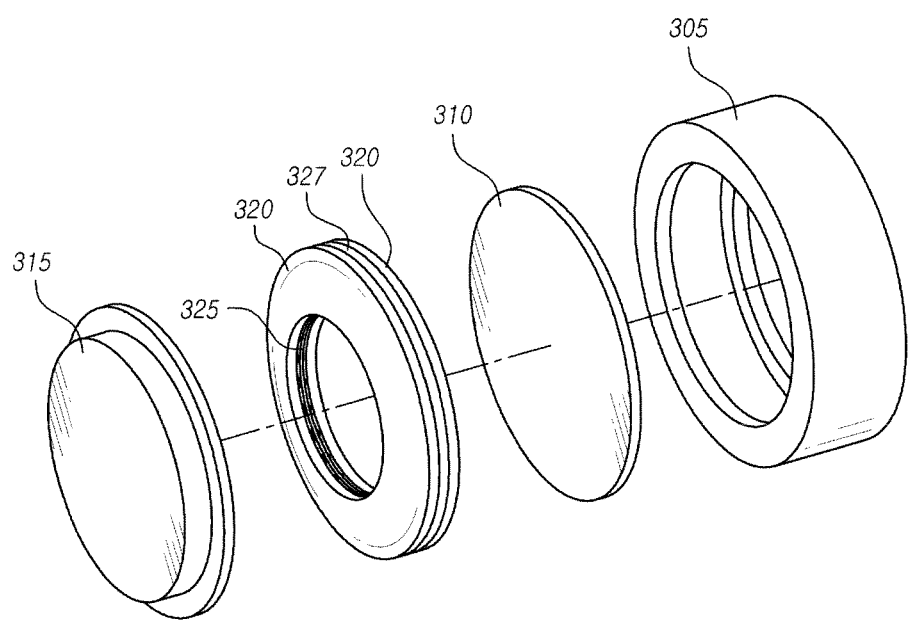
FIG. 3 is an exploded perspective view illustrating a first exemplary embodiment of the present invention.
Figure 4:
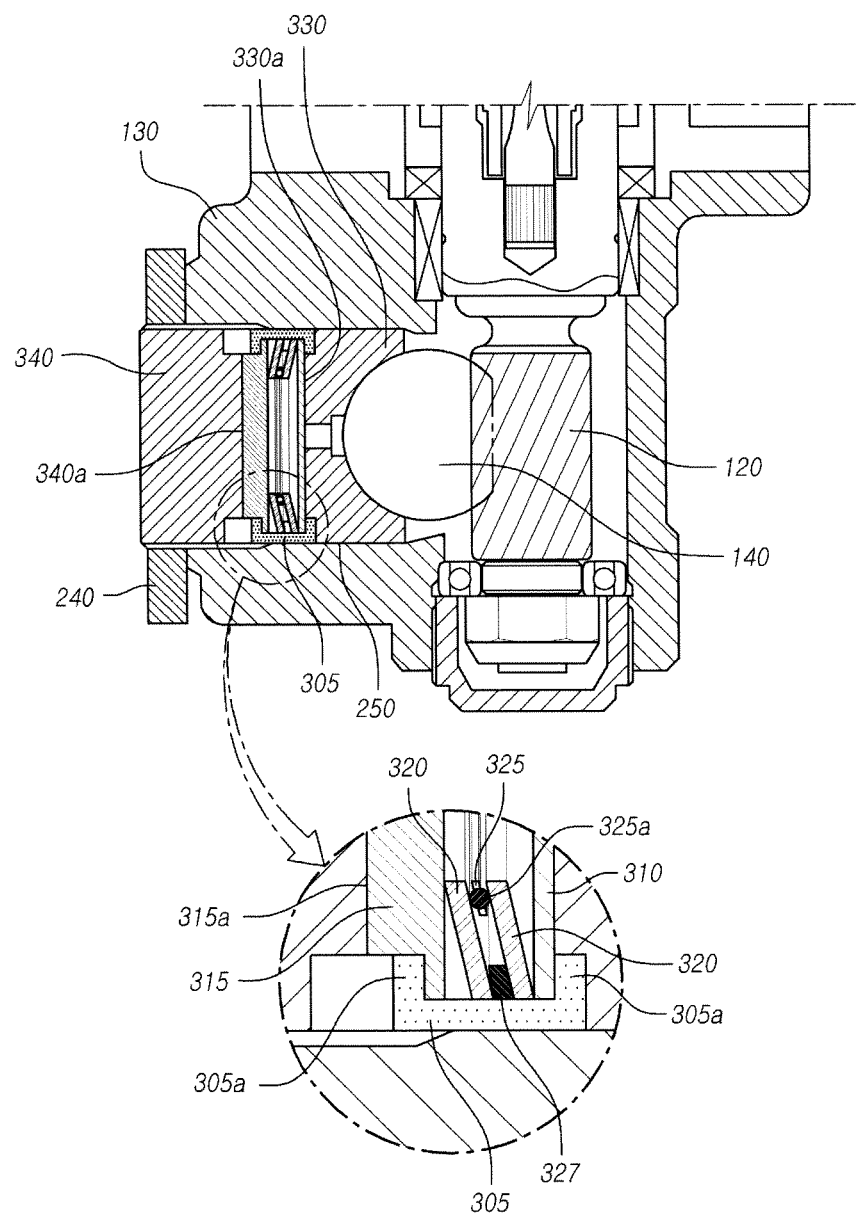
FIG. 4 is a cross-sectional view illustrating a second exemplary embodiment of the present invention.
Figure 5:
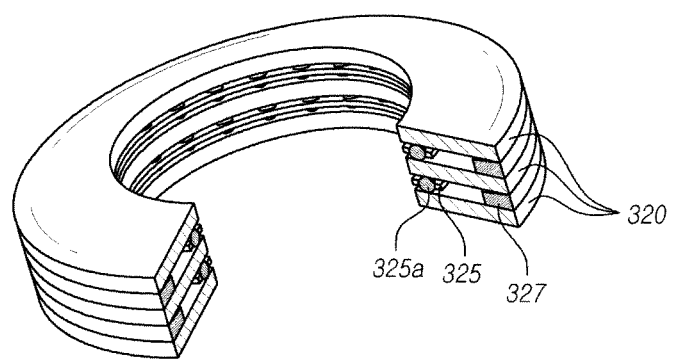
FIG. 5 is a perspective view illustrating another exemplary embodiment for an elastic embodiment of the first embodiment partially in cross-section.
Figure 6:
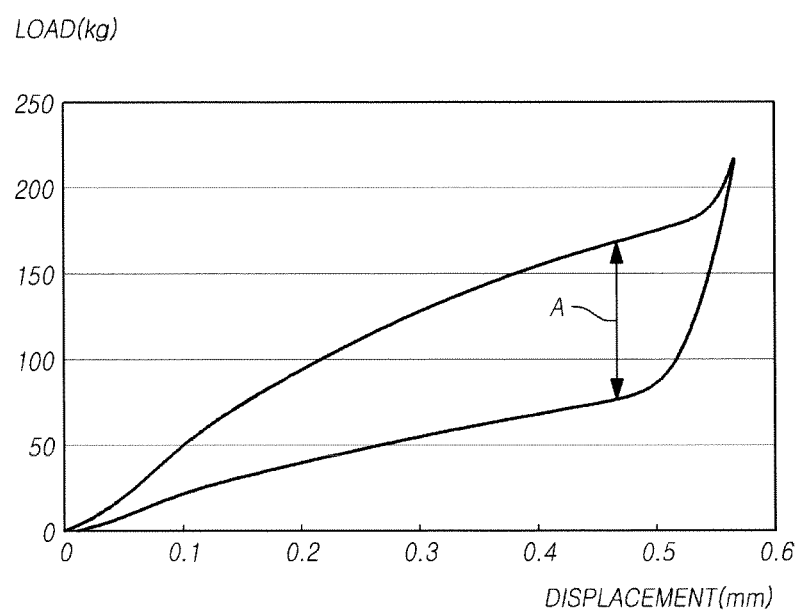
FIG. 6 is a graph showing a relationship of load versus displacement of the elastic support module in accordance with the first embodiment when a ball support member and a plate support member are not provided therein.
Figure 7:
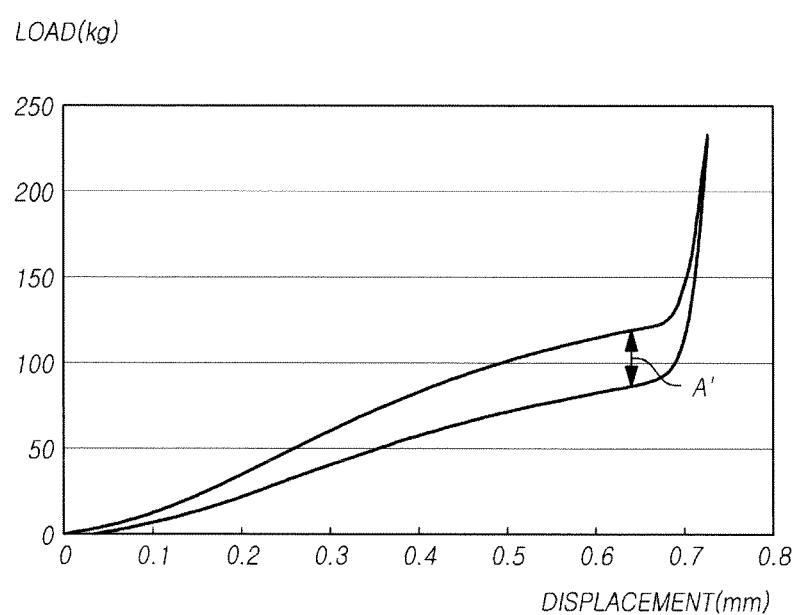
FIG. 7 is a graph showing a relationship between load and displacement of the elastic support module in accordance with the first exemplary embodiment of the present invention.

FIG. 3 is an exploded perspective view illustrating a first embodiment of the present invention, FIG. 4 is a cross-sectional view illustrating a second embodiment of the present invention, and FIG. 5 is a perspective view illustrating another embodiment for an elastic embodiment of the first embodiment partially in cross-section. In addition, FIG. 6 is a graph showing a relationship of load versus displacement of the elastic support module in accordance with the first embodiment when a ball support member and a plate support member are not provided therein, and FIG. 7 is a graph showing a relationship of load versus displacement of the elastic support module in accordance with the first embodiment of the present invention.

As illustrated in these drawings, an elastic support module in accordance with an first exemplary embodiment of the present invention includes: a hollow housing 305 which is provided with collars 305a at both sides thereof; first and second spacers 310 and 315 which are coupled to and supported by the collars 305a, respectively; at least two elastic members 320 which are interposed between the first and second spacers 310 and 315, and each of which is formed in an annular shape to have inner and outer circumferences, each surface extending between the inner and outer circumferences being inclined in relation to the central axis of the elastic members 320; at least one ball support member 325, which is interposed between the elastic members 320, and is formed in an annular shape, a plurality of balls 325a being coupled to the ball support member 325 at positions spaced around the ball support member 325; and at least one annular plate support member 327 interposed between the elastic members 320.

In addition, a rack bar supporting device for a vehicle steering apparatus in accordance with a second exemplary embodiment of the present invention includes: a support yoke 330 configured to support a rack bar 140 against a pinion, and to be coupled to a cylinder 250 of a gear box 130; an elastic support module configured to support the support yoke 330 and to be coupled to the cylinder 250 of the gear box 130; and a yoke plug 340 configured to support the elastic support module and to be screw-coupled to the cylinder 250 of the gear box 130. The elastic support module includes: a hollow housing 305 which is provided with collars 305a at both sides thereof; first and second spacers 310 and 315 which are coupled to and supported by the collars 305a, respectively; at least two elastic members 320 which are interposed between the first and second spacers 310 and 315, and each of which is formed in an annular shape to have inner and outer circumferences, each surface extending between the inner and outer circumferences being inclined in relation to the central axis of the elastic members 320; at least one ball support member 325, which is interposed between the elastic members 320, and is formed in an annular shape, a plurality of balls 325a being coupled to the ball support member 325 at positions spaced around the ball support member 325; and at least one annular plate support member 327 interposed between the elastic members 320.

The elastic support module is adapted to produce an elastic force as the first and second spacers 310 and 315 are slid within the housing 305. The housing 305 formed in a hollow cylindrical shape is provided with collars 305a for preventing the first and second spacers 310 and 315 from escaping. The elastic members 320 and the ball support member 325 are assembled to the housing 305 in the following manner: the elastic members 320 and the ball support member 325 are inserted into the housing 305 and then the opposite collars 305a are inwardly bent or caulked, or the elastic members 320 and the ball support member 325 are inserted into the housing 305 in a state in which one of the collars 305a is formed, and then the other collar 305a is inwardly bent or caulked.

Each of the first and second spacers 310 and 315 is formed in a flat annular shape so that they can be slid within the housing 305. One or both of the first and second spacers 310 and 315 may be formed with a protrusion which protrudes to the outside when the first and second spacers 310 and 315 are fitted in the inner circumferences of the collars 305a of the housing 305, respectively. FIGS. 3 and 4 illustrate that the second spacer 315 is provided with the protrusion as an example.

The elastic members 320, which are adapted to be elastically deformed to produce an elastic force when a load is applied to the elastic support module from the outside, are formed in an annular shape to be interposed between the first and second spacers 310 and 315, and are configured such that a surface extending between the outer and inner circumferences of each of the elastic members 320 is inclined in relation to the central axis thereof.

FIG. 4 illustrates two elastic members 320 stacked with and coupled to one another, and FIG. 5 illustrates three elastic members 320 stacked with and coupled to one another, in which the ball support member 325 and the plate support member 327 are interposed between two adjacent elastic members 320.

At least two elastic members 320 are coupled to each other. Since the ball support member 325 and the plate support member 327 are interposed between two adjacent elastic members 320, a difference in deformation between the outer and inner circumferences can be uniformly reduced when each of the elastic members 320 is elastically deformed.

That is, when only the elastic members 320 are coupled to the housing 305 without the ball support member 325 and the plate member 327 interposed between the elastic members 320, the surfaces extending between the outer and inner circumferences of the elastic members 320 are cause to be frictionally slid against and to interfere with each other. As a result, the load distribution A in relation to a displacement will be increased as shown in FIG. 6. As the distribution of an elastic deformation characteristic is increased, it is impossible to obtain uniform elastic deformation when the same external load is transmitted.

However, when the ball support member 325 and the plate support member 327 are interposed between the elastic members 320, the load distribution A' for a displacement will be reduced as shown in FIG. 7. As a result, elastic deformation and load absorption desired to be obtained can be uniformly produced. The ball support member 325 has an annular shape, and a plurality of balls 325a are fitted through and rotatably coupled to the ball support member 325 at a plurality of positions spaced around the ball 325a support member 325, respectively. Consequently, when the elastic members 320 are deformed in the axial direction to reduce the difference between the inner and outer circumferences, the balls 325a perform a rolling movement, thereby reducing the friction and interference.

In addition, the plate support member 327 is formed with an inclined surface so that the thickness of the plate support member 327 is reduced as approaching from one of the outer and inner circumferences of the plate support member 327 to the other of the outer and inner circumferences. As a result, when the elastic members 320 are deformed in the axial direction to reduce the difference between the inner and outer circumferences thereof, the plate support member 327 retains the space between the elastic members 320 uniformly, so that elastic force can be uniformly produced.

One of the ball support member 325 and the plate support member 327 is coupled to one side or the other side of the inner circumferences and outer circumferences of the elastic members 320, and the other of the ball support member 325 and the plate support member 327 is coupled to the other side or the one side of the inner circumferences and outer circumferences of the elastic members 320.

As a representative exemplary embodiment employing such an elastic support module, a rack bar supporting device for a vehicle steering apparatus is illustrated in FIG. 4. Now, a description will be made focused on the differences between the present embodiment and the first exemplary embodiment.

The support yoke 330 is in close contact with the rear side of the rack bar 140 engaged with the pinion gear 120 to support the rack bar 140 forward so that the rack bar 140 and the pinion gear 120 can be excellently engaged with each other.

The support yoke 330 is provided with a support portion 330a on the rear side thereof, in which the support portion 330a is formed to protrude so as to support the elastic support module. As a result, in order to make the rack bar 140 and the pinion gear 120 come into close contact with each other to efficiently transmit force, the support yoke 330 pushes the support yoke 330 forward using an elastic force of the elastic support module produced as the support yoke 330 is supported by the yoke plug 340, so that a predetermined clearance between the support yoke 330 and the rack bar 140 can be maintained.

That is, the support yoke 330 inserted into the cylinder 130 of the gear box 130 so that the front surface of the support yoke 330 comes into close contact with the rear surface of the rack bar 140, and the elastic support module supported by the yoke plug pushes the rear side of the support yoke 330 forward by elastic force.

The yoke plug 340 is adapted to be screw-coupled to a cylinder 250 in the gear box 130 and to be fixed by a lock nut 240, and the yoke plug 340 is provided with the support portion 340a on the front side thereof, in which the support portion 340a is formed to protrude so as to support the elastic support module.

In accordance with the present invention configured and shaped as described above, it is possible to prevent a noise from being produced due to the increase of a clearance caused when a vehicle has lost the driving durability thereof to a certain degree and hence a support yoke of the vehicle is worn, or due to impact reversely input from a road surface, and hence to provide a pleasant steering feeling for a driver when steering the vehicle.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An elastic support module comprising:
   a hollow housing which is provided with collars at both sides thereof;
   first and second spacers which are coupled to and supported by the collars, respectively;
   at least two elastic members which are interposed between the first and second spacers, and each of which is formed in an annular shape to have inner and outer circumferences, each surface extending between the inner and outer circumferences being inclined in relation to the central axis of the elastic members;
   at least one ball support member, which is interposed between the elastic members, and is formed in an annular shape, a plurality of balls being coupled to the ball support member at positions spaced around the ball support member, respectively; and
   at least one annular plate support member interposed between the elastic members.

2. The elastic support module as claimed in claim 1, wherein the ball support member is coupled to one side of the inner and outer circumferences between the elastic members, and the plate support member is coupled to the other side of the inner and outer circumferences.

3. The elastic support module as claimed in claim 2, wherein the thickness of the plate support member is reduced from one side of the inner and outer circumferences thereof to the other side of the inner and outer circumferences thereof to form an inclined surface.

4. A rack bar supporting device for a vehicle steering apparatus comprising:
   a support yoke configured to support a rack bar against a pinion, and to be coupled to a cylinder of a gear box;
   an elastic support module configured to support the support yoke and to be coupled to the cylinder of the gear box; and
   a yoke plug configured to support the elastic support module and to be screw-coupled to the cylinder of the gear box,
   wherein the elastic support module comprises:
   a hollow housing which is provided with collars at both sides thereof;
   first and second spacers which are coupled to and supported by the collars, respectively;
   at least two elastic members which are interposed between the first and second spacers, and each of which is formed in an annular shape to have inner and outer circumferences, each surface extending between the inner and outer circumferences being inclined in relation to the central axis of the elastic members;
   at least one ball support member, which is interposed between the elastic members, and is formed in an annular shape, a plurality of balls being coupled to the ball support member at positions spaced around the ball support member, respectively; and
   at least one annular plate support member interposed between the elastic members.

5. The rack bar supporting device as claimed in claim 4, wherein the ball support member is coupled to one side of the inner and outer circumferences between the elastic members, and the plate support member is coupled to the other side of the inner and outer circumferences.

6. The elastic support module as claimed in claim 5, wherein the thickness of the plate support member is reduced from one side of the inner and outer circumferences thereof to the other side of the inner and outer circumferences thereof to form an inclined surface.

7. The rack bar supporting device as claimed in claim 4, wherein the yoke plug is provided with a support portion on the front side thereof, which is formed to protrude so as to support the elastic support module.

8. The rack bar supporting device as claimed in claim 4, wherein the support yoke is provided with a support portion on the rear side thereof, which is formed to protrude so as to support the elastic support module.

* * * * *